UNITED STATES PATENT OFFICE.

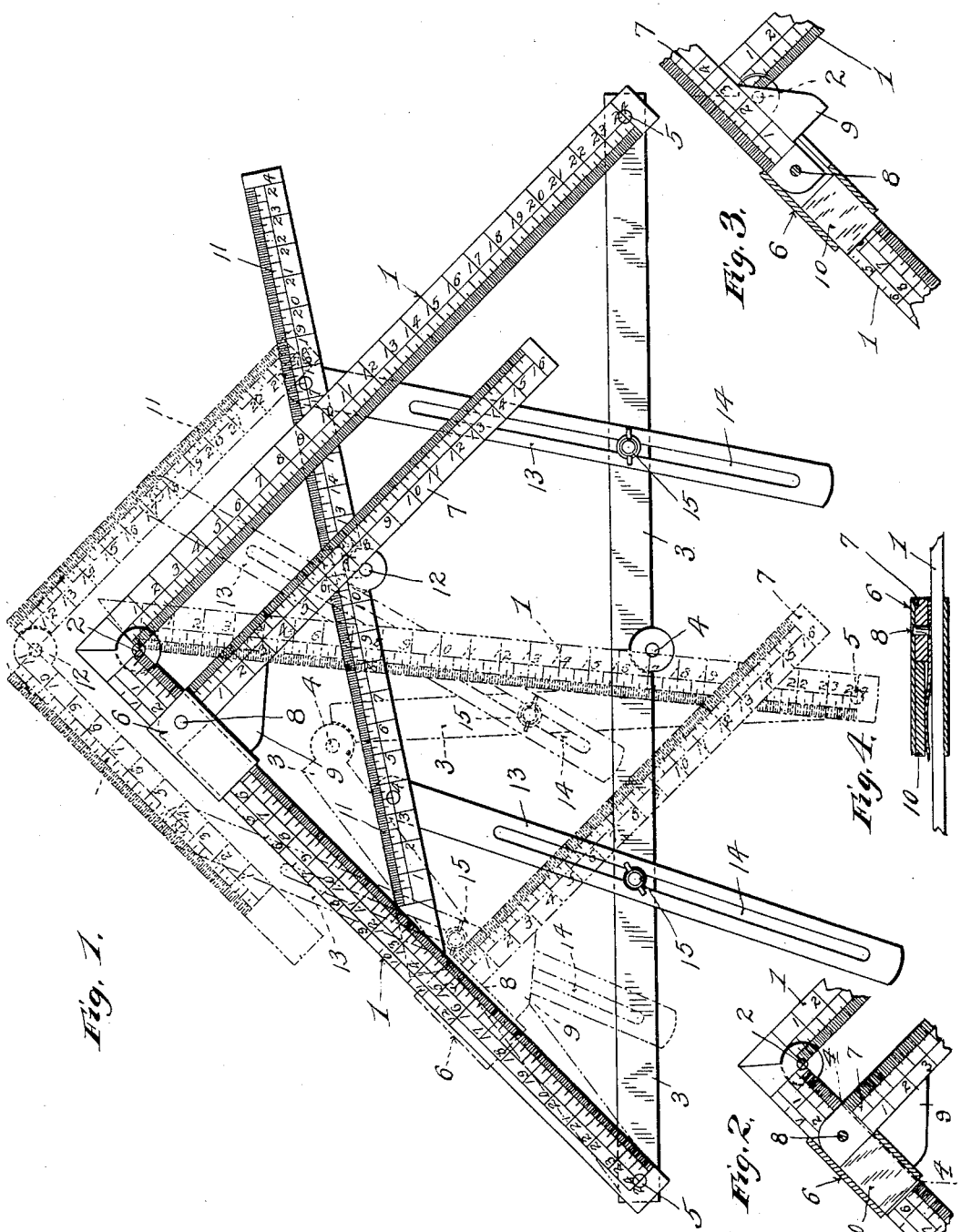

CHRES LARSEN, OF COUNCIL BLUFFS, IOWA.

CARPENTER'S SCALE.

SPECIFICATION forming part of Letters Patent No. 657,169, dated September 4, 1900.

Application filed May 4, 1900. Serial No. 15,441. (No model.)

*To all whom it may concern:*

Be it known that I, CHRES LARSEN, a citizen of the United States, residing at Council Bluffs, in the county of Pottawattamie and State of Iowa, have invented certain new and useful Improvents in Carpenters' Scales; and I do hereby declare the following to be a full, clear, and exact description of the invention, such as will enable others skilled in the art to which it appertains to make and use the same.

My invention has for its object to provide an improved scale especially adapted for use by carpenters or builders for laying out or determining the length of the various rafters of a roof.

To the above ends the invention consists of the novel devices and combinations of devices hereinafter described, and defined in the claims.

The invention is illustrated in the accompanying drawings, wherein like characters indicate like parts throughout the several views.

Figure 1 is a plan view of my improved scale, the same being illustrated in one position by full lines and in another position by dotted lines. Fig. 2 is a detailed view in plan, some parts being sectioned and others being broken away, showing a portion of the scale. Fig. 3 is a view corresponding to Fig. 2, but showing the so-called "traveling" rule as thrown into a folded position; and Fig. 4 is a section on the line 4 4 of Fig. 2.

The main portion of the scale is the square indicated by the numeral 1, the legs of which are pivoted at 2 and adapted for folding movement in one direction only. A folding spacing-bar 3, the sections of which are pivoted at 4, is pivotally connected at its ends to the ends of the legs of the square 1, as shown at 5. Mounted to slide on one leg of the square 1 is a traveling block 6, to which a traveling rule 7 is pivotally attached at 8. A stop-lug 9 on the said scale 7 engages the block 6 to stop the said scale 7 in the position at a right angle to that leg of the square on which it moves. The scale 7 is adapted to be turned into the position illustrated in Fig. 3, and it is adapted to be frictionally held in either one of its two positions by a spring-pressed plunger 10, that works within the sliding block 6 and is engageable with the pivoted end of the said scale 7, as illustrated in Figs. 2, 3, and 4.

For coöperation with the square 1 and scale 7 a so-called "floating" rule 11 or scale which is universally adjustable in the plane of the square 1 is provided. Preferably the floating scale 11 is made in sections that are pivoted at 12, and the said scale is supported by a pair of links 13, having elongated slots 14, with which thumb-nutted bolts 15 coöperate to adjustably secure the said links to the spacing-bar 3, heretofore noted. Both legs of the square 1, the traveling scale 7, and the so-called "floating" scale 11 are graduated on the same reduced scale and in denominations of feet and inches. These parts may be graduated on any scale, according to the size of the device. I have found that three-fourths of an inch to the foot will give an instrument of convenient size and of sufficient range for all ordinary work.

This instrument was especially designed to enable a carpenter or builder without computation to determine the lengths of the various rafters of a roof—such, for instance, as the jack-rafters, hip-rafters, valley-rafters, &c. The instrument is capable of many uses, but few of which for the purposes of this application are thought necessary to enumerate. Suppose with a building twenty-four feet square a hip-roof is to be constructed and the rafters thereof to be determined. To determine the length of the longest roof-rafter, the zero end of the floating rule 11 is registered with the twelve-foot mark on one leg of the square 1, and the intermediate portion thereof is crossed at the eight-foot mark (eight feet being the assumed height of the roof) of the other leg of the square 1. Then on the floating rule 11 we see indicated as the length of the roof-rafter fourteen and one-half feet. If the jack-rafters are to be spaced two feet apart, then the block 6 is slid to the two-foot mark on the leg of the square 1, and on the scale 11, by its inner section of the scale 7. we find that the first jack-rafter should be twelve feet in length. By moving the block 6 and scale 7 step by step the indications of two feet on the square 1 and noting the intersection of the scales 7 and 11 the other jack-rafters are readily indicated in length. To determine the length of the hip-rafter, the scale 7 is slid into alinement with the mark indicated fourteen and one-half feet on the leg of the square 1. Then the other leg of the square is moved on the pivot 2 until it intersects the twelve-foot mark on the traveling scale 7, as indicated by dotted lines in Fig. 1. Hence on the moved arm of the square at its intersection with the scale 7 is indicated nineteen feet, which is the length of the hip-rafter.

The scale when accurately constructed will give accurately the dimensions of the various rafters by the manipulations indicated, but on the drawings the readings may vary somewhat from the proper indications.

The scale above described is capable of many other uses than those indicated, and many of these uses will suggest themselves to skilled mechanics. For the use of workmen purchasing these devices directions as to the use of the instrument for all or many of the purposes to which it may be put will be given in full; but the description above given is thought to be sufficient for the purposes of this case.

What I claim, and desire to secure by Letters Patent of the United States, is as follows:

1. The combination with the graduated square 1, the legs of which are pivoted at 2, of the hinged spacing-bar 3 connecting the legs of said square, the hinged and graduated rule 11 adjustably connected to said spacing-bar by the slotted links 13 and the sliding block 6 adjustable on one leg of said square and provided with a graduated rule 7, said parts operating substantially as described.

2. The combination with the graduated square 1, the legs of which are pivoted at 2, of the hinged spacing-bar 3, connecting the legs thereof, the hinged rule 11 adjustably connected to said bar 3 by the slotted links 13, the sliding block 6 on one leg of said square, and the graduated rule 7 pivoted to said block 6 and provided with the projection 9 for limiting its movement in one direction, substantially as described.

In testimony whereof I affix my signature in presence of two witnesses.

CHRES LARSEN.

Witnesses:
C. M. PENNELL,
J. Q. ANDERSON, Jr.